Figure 1:
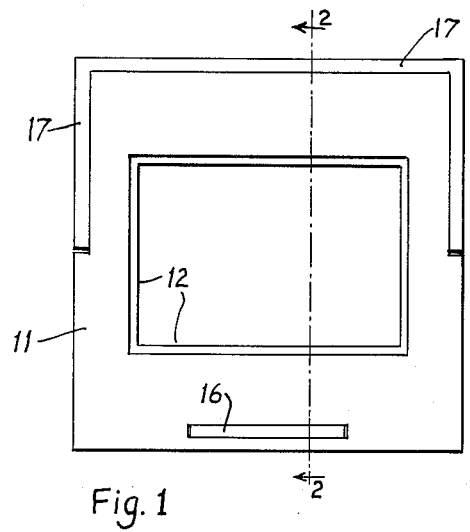

United States Patent Office 3,235,990
Patented Feb. 22, 1966

3,235,990
MOUNT FOR PHOTOGRAPHIC TRANSPARENCIES
Walter Back, Colonia Nuova Santa Maria,
Mexico City, Mexico
Filed Nov. 26, 1963, Ser. No. 325,974
6 Claims. (Cl. 40—152)

This invention relates to a mount for photographic transparencies, to mount or hold a small piece of photographic film in a manner enabling it to be handled by the conventional projector.

An object of the invention is the provision of a generally improved and more satisfactory mount.

Another object is the provision of a mount made of two parts of identical size and shape, so that they can be molded or stamped from the same set of dies or mold parts, the two pieces being assembled in resiliently interlocking relation to each other and so arranged as to hold the transparency between them.

Still another object is the provision of such a mount, so designed and constructed that it can be easily taken apart to remove the mounted transparency, without damage either to the parts of the mount or to the transparency.

A further object is the provision of a mount of improved form in which the parts are held in assembled relation to each other sufficiently firmly so as to avoid any danger of accidental disengagement, even though they may be easily disengaged or disassembled when it is desired to do so, without the need of any tools.

A still further object is the provision of a mount so designed that, in addition to holding the transparency itself, thin glass plates may be employed to protect the transparency from dirt and from finger marks, the glass plates being either in contact with opposite faces of the transparency or, preferably, being slightly spaced from the transparency in order to avoid the optical phenomenon known as Newton rings.

Another object is to the provision of a mount so designed that it needs no machinery or tools for initial assembling of the mount, but can be assembled merely by moderate manual finger pressure.

Still another object is the provision of a mount having parts for engaging the edges of the piece of cut film or transparency, while the mount is being assembled, so that the film cannot become twisted or tilted to an undesired angle either during assembly or after completion of assembly, but will always remain properly oriented.

A further object is the provision of a mount so designed that if one part is accidentally broken, it can easily be replaced by another part, since the mount is made up of parts which are identical in shape and size.

A still further object is the provision of a mount which is adaptable to manufacture of parts in different colors, so that the complete assembled mount may be made of two parts identical in size and shape, but of different colors, both to give a more pleasing appearance, and to show quickly the places where one should exert pressure when it is desired to disassemble the mount or take it apart, the use of different colors on the two parts of the mount also enabling the mount to be made of colors which correspond to the dominant color scheme used on the package of film, and also enabling the user to employ different colors in combination with each other in order to code different groups of slides to differentiate them from each other. This presupposes that the user of the slides would provide himself with a supply of slide parts of various different colors, with which he could easily and quickly remount his slides according to any coding color scheme desired, after initially receiving the mounted slides back from the processor.

A further object is the provision of a slide mount so designed that it can be manufactured from plastic material sufficiently cheaply to compete with conventional cardboard mounts and yet have the many advantages over conventional cardboard mounts as herein mentioned.

Figure 2:
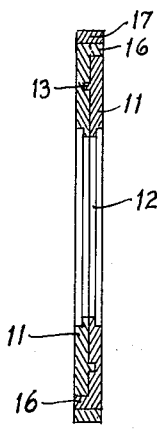
Figure 3:
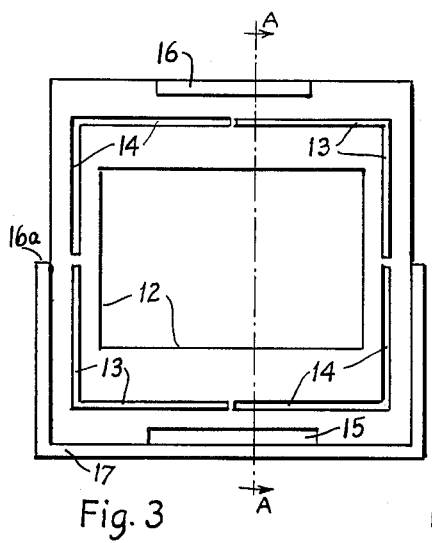
Figures 3A, 4A:
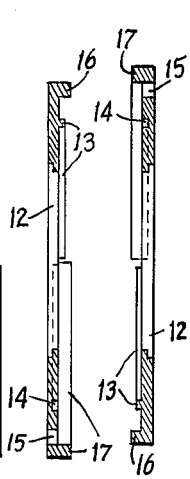
Figure 4:
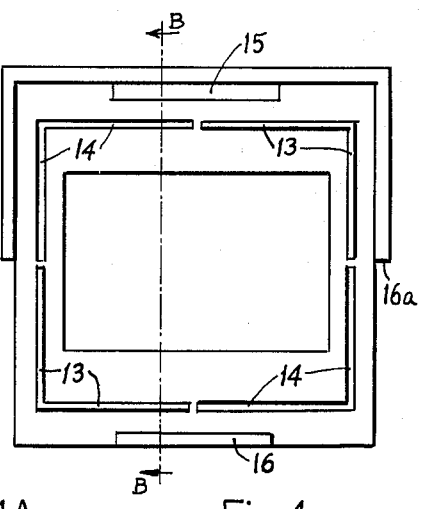
Figure 5:
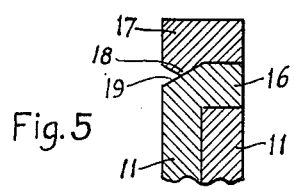

These and other desirable objects may be attained in the manner disclosed as an illustrative embodiment of the invention in the following description and in the accompanying drawings forming a part hereof, in which:

FIG. 1 is a plan view of the complete mount;
FIG. 2 is a cross section taken substantially on the line 2—2 of FIG. 1;
FIG. 3 is a face view of the inner face of one of the two identical plastic members which form the complete mount;
FIG. 3A is a cross section substantially on the line A—A of FIG. 3;
FIG. 4 is a face view of the inner face of the second one of the two identical plastic parts which make up the complete mount;
FIG. 4A is a section taken substantially on the line B—B of FIG. 4; and
FIG. 5 is a fragmentary cross section on the upper part of the line 2—2 of FIG. 1, on an enlarged scale.

The mount of the present invention comprises two frame members of identical form and of such shape that when one of the members is inverted end for end or top for bottom with respect to the other identical member (that is, turned through 180 degrees in its own plane) it will fit the other member in complementary fashion and form a frictional fit therewith, sufficiently tight to avoid being dislodged accidentally in normal handling, yet so constructed that the two members can be easily separated from each other quickly and without damage, when desired. The photographic transparency is mounted between these two members. The frame members are made from any suitable material, and could be of wood or metal, but preferably are made of molded plastic material of a kind having a slight degree of resiliency.

Each of the two identical parts of the complete mount is indicated in general at 11. Since the two parts are identical, and may in fact be molded from the same identical mold if they are made of molded material such as plastic, a description of one of the parts will suffice for both, and the way in which the two parts fit each other will be described later.

Each part has a window or aperture 12 of the right size to show the desired portion of the photographic transparency which is to be mounted in the frame or mount. If it is desired to use glass plates for protecting the photographic transparency, the material around the window 12 may be rabbeted slightly on either the outer face or the inner face, to receive the edges of a thin glass plate.

In referring to the two pieces which together make up the complete mount or frame, one face may be described as the outer face and the other face as the inner face, the two faces which fit against each other when the mount is assembled being, of course, the inner faces, while the outer faces are the faces which are outside when the two parts are assembled. The outer face may be plane or smooth, except for the glass-receiving rabbet around the window 12 (if it is desired to provide such a rabbet) or a part or all of the outer face may be roughened if desired, so that names, dates, or identifying marks can be written upon the roughened portion.

The inner face of each piece is formed with inwardly projecting flanges 13 at two diagonally opposite corners, spaced somewhat outwardly from the edges of the window 12 and somewhat inwardly from the extreme outer edges of the frame member. Each of these flanges 13 is L-shaped, with two parts at right angles to each other, and each part extending substantially half way along the corresponding side of the mount, as will be readily understood from the drawings. Each of the two mount members 11 also has a pair of slots 14 adjacent the other diagonally opposite corners of the window 12, these slots 14 being alined with and of the same size as the flanges 13, as will be readily seen from the drawings.

In addition, each of the frame members 11 has a slot 15 extending all the way through the thickness of the material, parallel to and spaced slightly inwardly from one edge (being the bottom edge in FIG. 3 and the top edge in FIG. 4) and extending through only a part of the length of the adjacent edge, such as for example about one-half of the length thereof, but the ends of the slot 15 are spaced equally from the adjacent corners. At the opposite edge of the mount member 11 (that is, at the top edge in FIG. 3 and the bottom edge in FIG. 4) there is a corresponding upstanding flange 16, located at the extreme edge of the mount member 11 and having a length substantially equal to but very slightly less than that of the slot 15.

There is also an upstanding flange 17 extending all the way along one edge of the mount part 11, being the bottom edge in FIG. 3 and the top edge in FIG. 4, and also extending at right angles thereto, along half of the length of the two adjacent sides or edges of the mount. The flange 17 terminates at the points 16a which are at the mid-points of their respective side edges of the mount.

It should be understood that the grooves 14 do not extend all the way through the thickness of the material, but only part way through. Likewise, the upstanding flanges 13 have a relatively shallow height, and when the two frame members which together make up the complete mount are properly assembled, there is some play between the flanges 13 on one member and the slots or grooves 14 on the other, the play being both with respect to the widths of the flanges and grooves, and with respect to the depth thereof. In other words, the flanges 13 do not have tight fits in the grooves 14. The purpose of the upstanding flanges 13 is to hold the photographic transparency properly in position against twisting and tilting or lateral displacement. The spacing of the flanges 13 at one corner from the flanges 13 at the opposite corner is the spacing which will just snugly receive the transparency when it is cut to the standard size to which such transparencies are normally cut at the conclusion of the processing operation. Also, the flanges 17 do not engage tightly with the unflanged part of the periphery of the other mount member, but have a loose fit therewith, when assembled.

The flanges 16 and slot 15 do, however, have a snug fit with each other, and they constitute the tight interfitting parts which hold the two members in assembled condition. The slot 15 extends all the way through the thickness of the material, and the upstanding flange 16 is of the proper height so that when the two parts are assembled, it will extend all the way through the slot 15 of the other frame member, and the outer end of the flange 16 will be substantially flush with the outer face of the other member. Likewise the upstanding flanges 17 are of a height substantially equal to the thickness of the main body of each member of the mount, so that the flanges 17 will completely cover the edges of the other member of the mount, when the parts are assembled.

It will be seen by comparing FIG. 3 with FIG. 4, that the inner faces of the two parts here shown are identical with each other, but one is inverted with respect to the other. When two identical members are placed in this inverted position with respect to each other, they can then be assembled with the two inner faces against each other, and with the photographic film transparency between them, of course, and properly held in position by the upstanding flanges 13. When the two parts are assembled, the marginal flange 17 on one part will fit loosely around the edges of the other part on that portion of the periphery where there is no such flange 17. Also, the upstanding flange 16 on one member will snugly enter the slot 15 on the other member, and the resilient frictional engagement of the flange 15 in the slot 16 will serve to hold the two members in assembled relation.

However, in order to insure holding of the parts without accidental disengagement, it is preferred to shape the flange 16 and the slot 15 in such a way that they resiliently interlock with each other. This is best illustrated in FIG. 5, where it is seen that the outer side of the slot 15 is formed, in cross section, with a slight ridge 18 as illustrated. The outer edge of the member 11 opposite the flange 16 is formed with a slight bevel as indicated at 19. The material is sufficiently resilient so that, by applying moderate force, the flange 16 can be pushed into the slot 15 and the projecting part 18 will cooperate with the bevel 19 to help to hold the parts together, and they can nevertheless be easily separated when desired. However, the resilient frictional force is sufficient to prevent any possibility of accidental separation which might otherwise occur from an accidental blow, such for example as when the mount is dropped on the floor.

The use of the mount will be readily apparent from what has been said above, so far as concerns the assembling of the two pieces of the mount with a photographic transparency between them. When it is desired to open the mount to remove the transparency this is easily done by use of the finger nails or thumb nails, holding two opposite edges of the assembled mount in the two hands, and pressing a nail against the visible accessible part of one flange 16 on one side of the assembled mount and against the corresponding part of the other flange 16 on the other outer face of the mount. Slight pressure exerted in this way will overcome the resilient action of the parts 18 and 19 and will overcome the frictional force of the flanges 16 engaging the corresponding parts of the other piece of the mount, and thus the two parts of the mount can be easily separated from each other, to remove the transparency.

As already mentioned above, the two parts which are assembled with each other to make the complete mount are identical with each other in size, so they can all be molded from the same mold. It is preferred, however, to have the two parts of different colors, as this will show immediately the places where the finger nails must be pressed for opening the mount. Moreover, the use of two different colors contrasting with each other makes a more colorful and attractive appearance for the mount. In addition, colors can be selected which will have a relation to the kind or character of the film, or relation to the colors used by the manufacturer on the packages of the film. Thus, although the parts may all be made from a single identical mold, the manufacturer of the mount may mold a quantity of these parts from molding compound of one color, and then another quantity of parts from a molding compound of a second color. When the photographic transparencies are being mounted, the person doing the mounting will pick up one part from a supply of the mounts of one color and another part from the supply of those of a different color, and assemble them together.

A plastic mount of this kind is more rigid than the conventional cardboard mount heretofore used, so will protect the film better than a cardboard mount. Moreover, it is more permanent and less subject to gradual disintegration as a result of repeated handling and repeated projection. It can be assembled quicker than the conventional cardboard mount, and much quicker than other plastic mounts which have been proposed. Moreover, it can be disassembled to remove the transparency, with extreme ease, which is not true either of the conventional cardboard mount or of prior forms of plastic mounts, which are very hard to disassemble without danger of breaking the mount and possible damage to the transparency.

It is seen from the foregoing disclosure that the objects and purposes of the invention are well fulfilled. It is to be understood that the foregoing disclosure is given by

What is claimed is:

1. A mount for photographic transparencies comprising two members of identical size and shape adapted to be assembled in face to face relationship with a transparency held between them, each of said members being of approximately square outline with an upstanding marginal flange along one edge of its inner face and along approximately one half of the length of two adjacent edges, and having a slot extending through the entire thickness of the member in a location adjacent said first mentioned edge and an upstanding locking flange adjacent the opposite edge, each member also having a central aperture, the parts being so designed and proportioned that when two such members are brought together in reversely oriented face to face relationship, the upstanding marginal flange on each member will surround the portion of the periphery of the other member which has no such flange and the upstanding locking flange on each member will be tightly embraced in the slot in the other member.

2. A mount for photographic transparencies comprising two members of identical size and shape adapted to be assembled in face to face relationship with a transparency held between them, each of said members being of approximately square outline with an upstanding marginal flange along one edge of its inner face and along approximately one half of the length of two adjacent edges, and having a slot extending through the entire thickness of the member in a location adjacent said first mentioned edge and an upstanding locking flange adjacent the opposite edge, each member also having a central aperture, the parts being so designed and proportioned that when two such members are brought together in reversely oriented face to face relationship, the upstanding marginal flange on each member will surround the portion of the periphery of the other member which has no such flange and the upstanding locking flange on each member will be tightly embraced in the slot in the other member, the locking flange and the slot being formed with interengaging surfaces sloped to form resilient detent means tending to hold the two members in assembled relation to each other.

3. A mount for photographic transparencies comprising two members of identical size and shape adapted to be assembled in face to face relationship with a transparency held between them, each of said members being of approximately square outline with an upstanding marginal flange along one edge of its inner face and along approximately one half of the length of two adjacent edges, and having a slot extending through the entire thickness of the member in a location adjacent said first mentioned edge and an upstanding locking flange adjacent the opposite edge, each member also having a central aperture, the parts being so designed and proportioned that when two such members are brought together in reversely oriented face to face relationship, the upstanding marginal flange on each member will surround the portion of the periphery of the other member which has no such flange and the upstanding locking flange on each member will be tightly embraced in the slot in the other member, the upstanding locking flange on each member being of such height that when the two members are assembled the outer end of said locking flange will be substantially flush with the adjacent outer face of the other member, so that finger nail pressure may be exerted simultaneously against the exposed outer ends of the two locking flanges on the two members, to separate the two assembled members from each other.

4. A mount for photographic transparencies comprising two members of identical size and shape adapted to be assembled in face to face relationship with a transparency held between them, each of said members being of approximately square outline with an upstanding marginal flange along one edge of its inner face and along approximately one half of the length of two adjacent edges, and having a slot extending through the entire thickness of the member in a location adjacent said first mentioned edge and an upstanding locking flange adjacent the opposite edge, each member also having a central aperture, the parts being so designed and proportioned that when two such members are brought together in reversely oriented face to face relationship, the upstanding marginal flange on each member will surround the portion of the periphery of the other member which has no such flange and the upstanding locking flange on each member will be tightly embraced in the slot in the other member, each member also having upstanding locating flange means of angular formation adjacent to but spaced outwardly from two diagonally opposite corners of said aperture, for engaging the edges of a photographic transparency being mounted, each member also having grooves in locations complementary to said locating flange means so as to receive the flange means of the other member assembled therewith.

5. A construction as defined in claim 1, in which each of said members by itself is not strictly square, the half of each member which has the upstanding marginal flange being larger in outline than the part which does not have such flange, the completed mount being square when two such members are assembled to each other.

6. A construction as defined in claim 3, wherein each of said members is of a different color from the other member assembled therewith, so that the exposed end of the upstanding locking flange on one member will be conspicuously visible with relation to the surrounding face of the other member, to indicate the places where pressure should be applied to separate the two members from each other.

References Cited by the Examiner
UNITED STATES PATENTS
2,959,882  11/1960  Krull _____ 40—152
2,968,884   1/1961  Anastasio _____ 40—152

FOREIGN PATENTS
1,191,641   4/1959  France.

EUGENE R. CAPOZIO, *Primary Examiner.*